United States Patent Office 3,752,828
Patented Aug. 14, 1973

3,752,828
STABILIZATION OF LACTONE COMPOUNDS
Donald C. Best, South Charleston, W. Va., assignor to
Union Carbide Corporation, New York, N.Y.
No Drawing. Filed Dec. 7, 1970, Ser. No. 95,975
Int. Cl. C07d 7/06
U.S. Cl. 260—343                           7 Claims

ABSTRACT OF THE DISCLOSURE

The invention relates to inhibiting the development of color formation of monomeric lactones such as epsilon-caprolactone by incorporating therein an inhibiting amount of certain triorgano phosphorus compounds as exemplified by triphenylphosphine.

The invention relates to the stabilization of lactone compounds. In one aspect, the invention is directed towards inhibiting the development of undesirable color formation in lactone compounds. In another aspect, the invention is directed to the stabilization of epsilon-caprolactones and initiated polycaprolactone polyols using triorganophosphine compounds or triorganophosphinite compounds as the stabilizers therefor. In a still further aspect, the invention is directed to a process for achieving the stabilization of lactone compounds.

In the past, monomeric epsilon-caprolactone made by the oxidation of cyclohexanone with peracetic acid has generally had low color and low acidity when freshly distilled. During prolonged storage and in transit, however, this monomer gradually develops color and exhibits an increase in peroxide content. Color formation in epsilon-caprolactone is even more pronounced when it is subjected to elevated temperatures, e.g., about 200° C. for several hours.

One of the primary outlets for epsilon-caprolactone is in the preparation of intermediate chemical products such as initiated polycaprolactone polyols. Such polyols are a major ingredient in the preparation of polyurethane products having utility in adhesive, coatings, elastomeric and fiber applications. In many of these areas such as polyurethane fibers and coatings, the customer oftentimes desires and even demands that the polyurethane products, e.g., fibers and coatings, be essentially colorless. Consequently, it is desirable to incorporate into monomeric epsilon-caprolactones or polyol derivatives therefrom a stabilizer or inhibitor which prevents or significantly retards the formation of color in these chemicals. It is also desirable that the stabilizer or inhibitor of choice be added at an early stage, e.g., upon the recovery of freshly distilled epsilon-caprolactone.

It has been previously proposed to stabilize epsilon-caprolactones against the formation of undesirable color by incorporating therein small amounts of trialkylphosphites, e.g., tridecylphosphite, with/without an alkylated phenol such as 2,6-di-tertiary-butyl - 4 - methylphenol. Though epsilon-caprolactone thus stabilized exhibits little color formation over rather long periods of time, it has been found that the physical characteristics of polyurethane products prepared therefrom were oftentimes affected. It is believed that the trialkylphosphite stabilizer hydrolyzed to give small amounts of phosphoric and phosphorus acids in the lactone monomer and/or polymeric derivative thereof which ultimately resulted in a final polyurethane product of inferior or significantly poorer properties. A monitoring system to determine the amount of total phosphorus present in the monomer as well as the amount of active trialkylphosphite stabilizer therein has also been proposed as a means for ascertaining the quantity of phosphorus-containing acids hydrolyzed over a period of time. Such system suffers obvious economic and practical drawbacks.

The present invention is based on the discovery that an inhibiting amount of a triorganophosphine compound or a triorganophosphinite compound incorporated into monomeric lactones such as epsilon-caprolactones, imparts to such monomers a surprising and unexpected degree of color stability. Moreover, initiated polycaprolactone polyols made from such stabilized lactone monomers likewise exhibit this improved resistance to the development of undesirable color.

The invention contemplates the use of an inhibiting amount of triorganophosphine or triorganophosphinite compound of choice to impart resistance to the development of color. By the term "inhibiting amount," as used herein, is meant that quantity of triorganophosphine or triorganophosphinite compound which, when added to the lactone monomer, is sufficient to effectively inhibit development of color, thus providing a means whereby the lactone monomer remains essentially colorless. Expressed differently, the inhibiting amount of the inhibitor or stabilizer of choice will effectively prevent a noticeable increase of color with respect to the Gardner Standard Color Scale, that is, prevent a change in color of the lactone monomer from colorless to a definite yellow tint. The art is well apprised of the technique of inhibiting or stabilizing organic compounds in general and the amount to be employed will be governed, to a significant extent, by the choice and concentration of the phosphine compound or phosphinite compound, the lactone monomer of choice, the particular end use product to be prepared from the stabilized monomers, and other considerations.

Accordingly, one or more of the following objects will be achieved by the practice of the present invention. It is an object of the invention to provide a novel composition comprising a lactone compound and a triorganophosphine compound or triorganophosphinite compound as the color inhibitor therefor. Another object is to provide a novel composition comprising an epsilon-caprolactone which is effectively stabilized against the development of undesirable color during storage and in transit. A further object is to provide novel stabilized epsilon-caprolactones and initiated polycaprolactone polyols which can be fabricated into a wide variety of polyurethane products exhibiting good physical and mechanical properties. A yet further object is to provide a novel process for stabilizing epsilon-caprolactone by incorporating therein an inhibiting amount of a triorganophosphine compound or triorganophosphinite compound described hereinafter. Other objects will become readily apparent from a consideration of the specification.

The monomeric lactones which are contemplated in the practice of the invention are those (i) which are composed of carbon, hydrogen, and oxygen atoms, said oxygen being present in the form of the ester group

(ii) which contain from 5 to 7 carbon atoms in the ring nucleus which possess said ester group; (iii) which are free from ethylenic and acetylenic unsaturation; and (iv) which contain from zero to three alkyl and/or alkoxy substituents bonded to the carbon atoms of said ring nucleus, each of said substituents preferably containing no more than 4 carbon atoms.

Representative lactone monomers include, by way of illustration, the unsubstituted and alkyl- or alkoxy-substituted lactones such as epsilon-caprolactone; beta-methyl-caprolactone; gamma-methyl-epsilon-caprolactone; delta-methyl-epsilon-caprolactone; beta-ethyl - epsilon - caprolactone; gamma,delta - dimethyl - epsilon - caprolactone;

beta,delta,delta-trimethyl - epsilon - caprolactone; alpha-methyl-delta-ethyl-epsilon-caprolactone; gamma - isopropyl-epsilon-caprolactone; beta-n-hexyl-epsilon - caprolactone; beta-methoxy-epsilon-caprolactone; gamma-ethoxy-epsilon-caprolactone; beta - methoxy - gamma-ethoxy-epsilon-caprolactone; and the like.

Other lactones known in the art such as the zeta-enantholactones and the eta-caprylolactones can also be stabilized in accordance with the teachings set forth herein. Mixtures of monomeric lactones as well as the initiated poly-caprolactone polyols can also be effectively stabilized against undesirable color formation.

The triorganophosphine compounds and triorganophosphinite compounds which are suitable in the practice of the invention are those (i) which are free of ethylenic unsaturation ($>C=C<$) and acetylenic unsaturation ($-C\equiv C-$), (ii) in which each organo moiety is composed of carbon, hydrogen and oxygen atoms, and (iii) in which each organo moiety desirably does not exceed 18 carbon atoms. Illustrative of the triorganophosphine compounds and triorganophosphite compounds which are suitable include the triarylphosphines, the trialkylphosphines, the O - alkyldiarylphosphinites, the trialkylphosphinites, and the like. Typical compounds include triphenylphosphine, trinaphthylphosphine, tritolylphosphine, n-butyldiphenylphosphine, tri-n-butylphosphine, tri - n - octylphosphine, O-n-propyldiphenylphosphinite, O - n - octylditolylphosphinite, O - (2-ethylhexyl)diphenylphosphinite, and the like. The triarylphosphines such as triphenylphosphine and the O-alkyldiarylphosphinites such as O-octyldiphenylphosphinite are preferred.

As indicated previously, the invention contemplates an inhibiting amount of the triorganophosphine compound or triorganophosphinite compound. In general, a concentration of from about 0.0001, and lower, to about 1.5, and higher, weight percent of inhibitor based on the weight of monomeric lactone or polyol derivative, is suitable. A preferred concentration is from about 0.005 to about 0.5 weight percent. Desirably, the inhibitor is added to freshly distilled monomeric lactones, or during or immediately after the preparation of initiated polylactone polyols. The preparation of such polyols is well-documented in the literature, for example, U.S. Pats. Nos. 3,169,945 and 3,284,418. A preferred method of addition is to add the inhibitor to the lactone or polyol under an inert atmosphere such as nitrogen. Agitation is desirable to obtain a uniform, homogeneous mixture.

If desired, one can use a mixture of a triorganophosphine compound and an alkylated phenol to stabilize or inhibit the formation of undesirable color in the lactone compounds. Alkylated phenols which are contemplated include the so-called "hindered" phenols illustrated in U.S. Pat. No. 3,274,216 and elsewhere such as the 2,6-dialkylphenols, e.g., 2,6-di-tertiary butyl-4-methylphenol. It has been observed, however, that mixture of a triorganophosphinite compound and an alkylated phenol is less effective as a color stabilizer for lactone compounds than the triorganophosphinite compound alone. For this reason, such latter mixtures are not desired. The concentration of the alkylated phenol, if employed, is of the order described previously in the discussion concerning the triorganophosphine and triorganophosphinite inhibitors.

The following examples are illustrative. In these examples the hindered phenol in all cases was 2,6-ditertiary-butyl-4-methylphenol. Parts per million (p.p.m.) are based on the lactone employed. All parts, unless otherwise stated, are by weight. The Pt-Co color was determined in accordance with ASTM Method D-1209. The compound tetraphenylpolypropylene glycol diphosphite has the following formula.

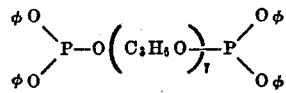

EXAMPLES 1-3

To each of three glass pressure bottles which had been previously dried at 100° C. and purged with high-purity nitrogen, there were added 100 grams of freshly distilled epsilon-caprolactone. The freshly distilled epsilon-caprolactone had a color of less than Pt-Co.

The pressure bottles were then numbered one through three. To Bottle No. 1 there was added 0.050 gram (500 parts per million) of triphenylphosphine; and to Bottle No. 2 there was added 0.050 gram (500 parts per million) of triphenylphosphine and 0.100 gram (1000 parts per million) of hindered phenol. Bottle No. 3 was used as a blank, and no hindered phenol or triphenylphosphine was added.

The pressure bottles were then capped, and placed into a steam bath operated at 95° C.±4° C. After a period of 218 hours, the bottles were removed from the bath. The stability of the epsilon-caprolactone triphenylphosphine samples were determined by comparing the color of the epsilon-caprolactone in Bottles Nos. 1 and 2 with that of the blank (Bottle No. 3) using ASTM Method D-1209-54. The results are shown in Table I below.

TABLE I

| Bottle number | Triphenylphosphine | | | Hindered phenol | | Color after 218 hours at 95° C., Pt-Co |
|---|---|---|---|---|---|---|
| | Grams | Moles×10⁴ | P.p.m. | Grams | P.p.m. | |
| 1 | .050 | 1.98 | 500 | Nil | Nil | 50 |
| 2 | .050 | 1.98 | 500 | 0.1000 | 1,000 | 60 |
| 3 | Nil | Nil | Nil | Nil | Nil | 90 |

EXAMPLES 4-6

To each of three glass pressure bottles which had been previously dried at 100° C. and purged with high-purity nitrogen, there were added 100 grams of freshly distilled epsilon-caprolactone. The freshly distilled epsilon-caprolactone had a color of less than 10 Pt-Co.

The pressure bottles were then numbered four through six. To Bottle No. 4 there was added 0.062 gram (620 parts per million) of O-n-octyldiphenylphosphinite; and to Bottle No. 5 there was added 0.061 gram (610 parts per million) of O-n-octyldiphenylphosphinite and 0.1000 gram (1000 parts per million) of hindered phenol. Bottle No. 6 was used as a blank and contained no hindered phenol or O-n-octyldiphenylphosphinite.

The pressure bottles were sealed and placed into a steam bath operated at 95° C.±4° C. After a period of 218 hours, the bottles were removed from the bath. The stability of the epsilon-caprolactone samples were determined by comparing the color of the epsilon-caprolactone in Bottle Nos. 4 and 5 with that of the blank (Bottle No. 6) using ASTM method D-1209-54. The results are shown in Table II below.

TABLE II

| Bottle number | O-n-octyldiphenylphosphinite | | | Hindered phenol | | Color after 218 hours at 95° C., Pt-Co |
|---|---|---|---|---|---|---|
| | Grams | Moles×10⁴ | P.p.m. | Gram | P.p.m. | |
| 4 | 0.062 | 1.97 | 620 | Nil | Nil | 10 |
| 5 | 0.061 | 1.94 | 610 | 0.100 | 1,000 | 100 |
| 6 | Nil | Nil | Nil | Nil | Nil | 90 |

EXAMPLES 7-8

Two equal samples of freshly distilled epsilon-caprolactone were stabilized as follows: Sample No. 7 contained 313 parts per million of tridecylphosphite and 30 parts per million of hindered phenol; and Sample No. 8 contained 158 parts per million of triphenylphosphine and 34 parts per million of hindered phenol. The two samples contained essentially equal phosphorus on a molar basis.

Sample Nos. 7 and 8 were stored in brown-glass containers maintained under nitrogen for a period of three weeks. After this period of time, the stabilized epsilon-caprolactone from Sample Nos. 7 and 8 were used in the preparation of two batches of initiated polycaprolactone diols having an average molecular weight of about 2,000. The color of the resulting polycaprolactone diols were then compared. The data is noted in Table III below.

The aforesaid initiated polycaprolactone diols were prepared as follows: To a reaction flask equipped with stirrer, thermometer, nitrogen inlet tube, and reflux condenser, there were charged 165 parts of epsilon-caprolactone, 10 parts of diethylene glycol as the initiator, and 0.01 part of stannous dioctanoate catalyst. The resulting mixture was heated to about 195° C. for a period of 12 hours under an atmosphere of dry nitrogen. There was obtained initiated polycaprolactone diol having a hydroxyl number of approximately 55, an acid number less than 0.5, and a melting range of about 45°–55° C.

TABLE III

| Number | Stabilizer | Diol color |
|---|---|---|
| 7 | Tridecylphosphite/hindered phenol | 35 Pt-Co |
| 8 | Triphenylphosphihe/hindred phenol | 30 Pt-Co |

EXAMPLES 9-12

(A) A common source of freshly distilled epsilon-caprolactone was used to prepare 4 equal samples stabilized as set out in Table IV below.

TABLE IV

| Sample number | $\epsilon$-Caprolactone, grams | Stabilizer (gms.) | Hindered phenol, mg.[1] |
|---|---|---|---|
| 9 | 3,592 | (n-$C_{10}H_{21}O$)$_3$P(3.23) | 0.32 |
| 10 | 3,592 | $\phi_3$P (1.795) | 0.32 |
| 11 | 3,592 | ([2]) (3.23) | 0.32 |
| 12 | 3,592 | None | 0.32 |

[1] 2,6-di-tertiary-butyl-4-methylphenol.
[2] Stabilizer employed was tetraphenylpolypropylene glycol diphosphite which was prepared by reacting polypropylene glycol of 425 average molecular weight with diphenylphosphorous chloride.

(B) Samples 9 through 12 above were then used as reactants in the preparation of initiated polycaprolactone diols having average molecular weights of about 2000. The procedure and operative conditions were essentially identical in all these experiments which were as follows. In each of the four experiments, epsilon-caprolactone (3592 parts, Samples Nos. 9 through 12 above) and diethylene glycol (208 parts) were charged to a glass kettle equipped with stirrer, thermometer, sintered glass sparger, and inlet-outlet tubes for the nitrogen sparge that was present during these experiments. The resulting solution was heated to 130° C. at which temperature 0.04 part stannous dioctanoate catalyst was added, followed by raising the temperature to about 185–190° C. Four hours after the first catalyst addition, an additional 0.04 part stannous dioctanoate was added thereto. The reaction mixture was maintained at 185°–190° C. until the acid number and viscosity thereof remained fairly constant. The total reaction period was 13 hours. The initiated polycaprolactone diols thus obtained possessed hydroxyl numbers of about 56 and acid numbers less than 0.05.

(C) The four initiated polycaprolactone diols prepared in accordance with paragraph B above were used to prepare prepolymers. The procedure and operative conditions were essentially identical in all cases. In these four experiments initiated polycaprolactone diol (500 parts; Nos. 9 through 12) was heated to 70° C.±5° C. in a reaction vessel maintained under a nitrogen blanket for a period of one hour. An 80/20 isomeric mixture of 2,4- and 2,6-tolyene diisocyanates (93 parts) was added thereto and the temperature of the resulting mixture was raised to 90° C.±5° C. and maintained thereat for a period of 3 hours. There was obtained an isocyanato-terminated product, i.e., prepolymer, having a free isocyanate content (percent) of 4.0 and a melting point of about 47°–48° C.

(D) Cast elastomers were prepared from each of the four prepolymers of paragraph C above using essentially identical procedures and conditions as follows. The prepolymer (210 parts) was added to a reaction vessel and maintained at a temperature of 95° C.±5° C. Degassing of the prepolymer was effected at 2 mm. of Hg for a period of 30 minutes. After this, the pressure was raised to atmospheric by the introduction of nitrogen into the vessel. The curative (14.5 parts), i.e., methylene-bis(ortho-chloroaniline), heated to about 125° C., was then added to the vessel. The resulting mixture was highly agitated for one minute again under 2 mm. of Hg, followed by introducing nitrogen to raise the pressure back to atmospheric. The resulting solution then was poured in molds maintained at 100° C. and cured in an oven for 16 hours at 100° C. The resulting urea-urethane elastomers were then subjected to the tests noted below.

(E) Specimens and tests of the four elastomers from paragraph E above were prepared and conducted in accordance with ASTM Method D412–64T, Die C. The hydrolytic stability of these elastomers were determined by measuring the percent retention of physical properties after immersion in water at a temperature of 90° C. for 7 days. The results of the hydrolytic stability determinations are shown in Table V below.

TABLE V.—PERCENT RETENTION OF PHYSICAL PROPERTIES

| Elastomer | 9[1] | 10[2] | 11[3] | 12[4] |
|---|---|---|---|---|
| 100% modulus | [5]152 | 90 | 99 | [5]135 |
| 300% modulus | 0 | 82 | 0 | 81 |
| Tensile strength | 19 | 47 | 13 | 25 |
| Elongation at break | 34 | 97 | 39 | [5]106 |

[1] Epsilon-caprolactone contained tri-n-decylphosphite and hindered phenol.
[2] Epsilon-caprolactone contained triphenylphosphine and hindered phenol.
[3] Epsilon-caprolactone contained tetraphenylpolypropylene glycol diphosphite and hindered phenol.
[4] Epsilon-caprolactone contained hindered phenol only.
[5] Number larger than 100 means hydrolytic degradation has occurred.

What is claimed is:

1. A color stabilized composition comprising a lactone compound and an amount of a triorganophosphorus compound at least sufficient to inhibit color development; (i) said lactone compound being of the group consisting of epsilon-caprolactone, $C_1$–$C_4$ alkyl-epsilon-caprolactone, and $C_1$–$C_4$ alkoxy-epsilon-caprolactone; and (ii) said triorganophosphorus compound being of the group consisting of triarylphosphine, trialkylphosphine, O-alkyldiarylphosphinite, and trialkylphosphinite, with the proviso that each organo moiety in said triorganophosphorus compound does not exceed 18 carbon atoms.

2. The color stabilized composition of claim 1 wherein said lactone compound is epsilon-caprolactone.

3. The color stabilized composition of claim 2 wherein said triorganophosphorus compound is triarylphosphine.

4. The color stabilized composition of claim 3 wherein the concentration of said triarylphosphine is from about 0.0001 to about 1.5 weight percent, based on the weight of said epsilon-caprolactone.

5. The color stabilized composition of claim 4 wherein said triarylphosphine is triphenylphosphine.

6. The color stabilized composition of claim 4 which contains an alkylated phenol in addition to said epsilon-caprolactone and said triphenylphosphine.

7. The color stabilized composition of claim 5 which contains 2,6-ditertiary-butyl-4-methylphenol in addition to said epsilon-caprolactone and said triphenylphosphine.

References Cited
UNITED STATES PATENTS
3,227,730  1/1966  Goldsmith et al. ____ 260—343

JOHN M. FORD, Primary Examiner

UNITED STATES PATENT OFFICE
CERTIFICATE OF CORRECTION

Patent No. 3,752,828     Dated August 14, 1973

Inventor(s) Donald C. Best

It is certified that error appears in the above-identified patent and that said Letters Patent are hereby corrected as shown below:

Column 3, line 52, "3,284,418" should read --- 3,284,417 ---.

Column 4, line 21, before "Pt-Co" insert --- 10 ---.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks